United States Patent
Yang

(10) Patent No.: US 9,946,368 B2
(45) Date of Patent: Apr. 17, 2018

(54) APPARATUS AND CONTROL METHOD

(71) Applicants: Beijing Lenovo Software Ltd., Beijing (CN); Lenovo (Beijing) Limited, Beijing (CN)

(72) Inventor: Jie Yang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 253 days.

(21) Appl. No.: 14/864,061

(22) Filed: Sep. 24, 2015

(65) Prior Publication Data

US 2016/0370887 A1    Dec. 22, 2016

(30) Foreign Application Priority Data

Jun. 19, 2015    (CN) .......................... 2015 1 0347742

(51) Int. Cl.
*G06F 3/0354*    (2013.01)
*G06F 3/041*    (2006.01)
*G06F 3/043*    (2006.01)

(52) U.S. Cl.
CPC ........ *G06F 3/03545* (2013.01); *G06F 3/0416* (2013.01); *G06F 3/0433* (2013.01);
(Continued)

(58) Field of Classification Search
CPC ................. G06F 3/0345; G06F 3/0416; G06F 2203/04106; G06F 2203/041;
(Continued)

(56) References Cited

U.S. PATENT DOCUMENTS 6,894,683 B2 *    5/2005    Clapper .............. G06F 3/03545
                                                  178/19.01
9,323,348 B2 *    4/2016    Nungester ........... G06F 3/03545
(Continued)

OTHER PUBLICATIONS

Midgette, Anne. "Video-game concerts, a movement that's more than a blip on orchestral landscape". Washington Post Style section, Jul. 28, 2010.*

*Primary Examiner* — Julie Anne Watko
(74) *Attorney, Agent, or Firm* — Schwegman Lundberg & Woessner, P.A.

(57) ABSTRACT

The present disclosure provides an apparatus and a control method. By means of arranging in an operating apparatus a first input member for locating a touch control position via a touch control operation and a second input member for issuing a vibration signal to be collected by an electronic device during the touch control operation, it is possible to determine an operation mode of the electronic device based on the vibration signal, and to operate the electronic device in the operation mode, thereby enabling to control the operation mode of the electronic device via the vibration signal issued when the operating apparatus is in contact with the electronic device. It can be seen that, the technical solutions of embodiments of the present disclosure can achieve more application functions by using apparatus for performing touch control operations on electronic devices, and thus can achieve the technical effect of extending the applicable range of the operating apparatus.

5 Claims, 2 Drawing Sheets

(52) U.S. Cl.
CPC ............... *G06F 2203/0381* (2013.01); *G06F 2203/0384* (2013.01); *G06F 2203/04106* (2013.01)

(58) Field of Classification Search
CPC ..... G06F 2203/0384; G06F 2203/0382; G06F 2203/0381; G06F 2203/038; G06F 2203/00; G06F 3/043; G06F 3/0433; G06F 3/0412; G06F 3/03547; G06F 3/03542; G06F 3/0354; G06F 3/033; G06F 3/03; G06F 3/0236; G06F 3/01; G06F 3/002; G06F 3/00
See application file for complete search history.

(56) References Cited

U.S. PATENT DOCUMENTS

| | | | | |
|---|---|---|---|---|
| 9,395,862 | B2* | 7/2016 | Kim | G06F 3/041 |
| 9,430,106 | B1* | 8/2016 | Olsen | G06F 3/044 |
| 9,436,306 | B2* | 9/2016 | Oguri | H04W 52/0254 |
| 9,760,187 | B2* | 9/2017 | Havilio | G06F 3/03545 |
| 2013/0106772 | A1* | 5/2013 | Kim | G06F 3/033 345/174 |
| 2014/0168177 | A1* | 6/2014 | Mkrtchyan | G06F 3/041 345/179 |
| 2014/0340328 | A1* | 11/2014 | Kameyama | G06F 3/03545 345/173 |
| 2015/0338940 | A1* | 11/2015 | Vong | H04L 65/403 345/179 |
| 2015/0378447 | A1* | 12/2015 | Nagano | G06F 1/1626 700/85 |
| 2016/0188291 | A1* | 6/2016 | Vilermo | G06F 3/167 345/156 |
| 2017/0054463 | A1* | 2/2017 | Shih | G06F 1/1694 |

* cited by examiner

APPARATUS AND CONTROL METHOD

CROSS-REFERENCE TO RELATED APPLICATION(S)

This application claims priority to the Chinese Patent Application No. 201510347742.6, filed on Jun. 19, 2015, which is incorporated herein by reference in its entirety.

TECHNICAL FIELD

The present disclosure relates to the field of electronic technology, and in particular, to an apparatus and a control method.

BACKGROUND

Currently, conventional styluses are typically used for performing accurate touch control operations on electronic devices such as mobile phones, tablet computers and the like. When using a stylus, a user usually clicks, by a tip of the stylus, on an area on which a touch control operation needs to be performed. Upon the tip of the stylus contacts with a touch-sensitive screen of an electronic device, an electrical response is generated, and thus a purpose of operating the electronic device is achieved.

However, functions of the conventional styluses generally comprise nothing more than contacting with the touch-sensitive screen, locating a position on the touch-sensitive screen where an operation is required, or generating simple instructions such as open, zoom in, zoom out, etc. by quickly clicking a preset number of times. However, it spends a certain cost in production of the stylus. Therefore, the stylus is typically costly, but its poor functions do not match with its cost.

It can be seen that the conventional operating apparatus for performing touch control operations on the electronic device has a technical problem of a higher cost but less functions, which causes a lower performance price ratio.

SUMMARY

The present disclosure provides a control method and an electronic device, in order to solve the technical problem of the conventional operating apparatus for performing touch control operations on the electronic device, i.e., the conventional operating apparatus implements less functions with a higher cost, and thus has a lower performance price ratio.

An aspect of the present disclosure provides an operating apparatus, comprising:

a first input member, arranged on a main body of the operating apparatus, configured for enabling an electronic device to locate a touch control position of the operating apparatus when the first input member is in contact with a first collection unit of the electronic device; and a second input member, arranged on the main body, configured for issuing a vibration signal to be collected by a second collection unit of the electronic device, when the first input member is in contact with the first collection unit.

Alternatively, the second input member is configured for knocking at a first component or the first collection unit to issue the vibration signal when the first input member is in contact with the first collection unit, wherein the first component is the main body or is a component arranged on the main body.

Alternatively, the first input member further comprises:

an electrical response component, configured for generating an electrical response and generating a response signal, when the first input member is in contact with the first collection unit and the first collection unit is in a working mode;

the second input member, configured for issuing the vibration signal upon receiving the response signal.

Alternatively, the second input member is particularly configured for continuing to issue the vibration signal when the first input member is in contact with the first collection unit, and stopping issuing the vibration signal when the first input member leaves the first collection unit.

Alternatively, the operating apparatus further comprises:

a pressure sensor, arranged in the main body, configured for detecting a pressure value when the first input member is in contact with the first collection unit, and issuing a first signal when the pressure value is no less than a predetermined threshold, in order to inform the operating apparatus of controlling the second input member to issue the vibration signal.

Alternatively, the main body is of a cavity structure; and the second input member comprises:

at least one striking component, movably arranged in a cavity of the main body, configured for knocking at a struck member on the operating apparatus to generate vibration, wherein if there are at least two striking components, the at least two striking components are respectively made of different materials for generating different vibration signals respectively;

the operating apparatus further comprises:

the struck member, arranged on a surface of the main body, configured for issuing the vibration signal when being struck by the second input member;

a switching mechanism, arranged in the cavity, configured for, controlling one of the at least one striking component to extend out of the cavity through a hole, while controlling the remaining of the at least one striking component to be located within the cavity.

Alternatively, the main body is of a cavity structure; and the first input member comprises:

at least one control component, movably arranged in the cavity of the main body, configured for issuing the vibration signal when contacting with the first collection unit, and locating the touch control position needed to be collected by the first collection unit, wherein if there are at least two different control components, the at least two different control components generate different vibration signals respectively;

the operating apparatus further comprises:

a substitution mechanism, arranged in the cavity, configured for, controlling one of the at least one control component to extend out of the cavity through an exit hole, while controlling the remaining of the at least one control component to be located within the cavity.

Another aspect of the present disclosure provides an electronic device, comprising:

a first collection unit, configuring for locating a touch control position of an operating apparatus when the first collection unit is in contact with the operating apparatus;

a second collection unit, configuring for receiving a vibration signal issued by the operating apparatus;

a processor, configured for determining a first operation mode of the electronic device based on the vibration signal, and for controlling the electronic device to operate in the first operation mode.

A further aspect of the present disclosure provides a control method, comprising:

receiving a first vibration signal issued by an operation apparatus when the operation apparatus is in contact with an electronic device;

determining a first operation mode of the electronic device based on the first vibration signal;

operating the electronic device in the first operation mode.

Alternatively, the first operation mode is a mode of displaying a first track with a first color and/or a first line type, wherein the first track is a corresponding track displayed by the electronic device when the electronic device is operated by an touch control operation of the operation apparatus.

Alternatively, the first operation mode comprises:

a mode of displaying a first background; and/or a mode of playing first music.

Alternatively, after the electronic device is operated in the first operation mode, the method further comprises:

receiving a second vibration signal issued by the operation apparatus;

determining a second operation mode different from the first operation mode, based on the second vibration signal received by the electronic device, wherein the second vibration signal is different from the first vibration signal;

switching the electronic device to operate in the second operation mode from operating in the first operation mode.

One or more of the technical solutions provided in the embodiments of the present disclosure have at least following technical effects or advantages:

By means of arranging, in the operating apparatus, the first input member for locating the touch control position via the touch control operation and the second input member for issuing vibration signal to be collected by an electronic device during the touch control operation, the technical solutions of the embodiments of the present disclosure may determine the operation mode of the electronic device based on the vibration signal, and operate the electronic device in this operation mode, thereby enabling to control the operation mode of the electronic device via the vibration signal issued when the operating apparatus is in contact with the electronic device. It can be seen that, the technical solutions of the embodiments of the present disclosure can achieve more application functions by using the apparatus for performing touch control operations on the electronic device, and thus can achieve a technical effect of extending the applicable range of the operating apparatus.

The embodiments of the present disclosure also have at least following technical effects or advantages:

Further, by means of controlling the second input member to knock at the operating apparatus or the first collection unit to issue the vibration signal, the technical solutions of the embodiments of the present disclosure can expand a selectable range of means for issuing the vibration signal, and thus can also achieve a technical effect of further extending the applicable range.

Further, by means of arranging the electrical response component, the technical solutions of the embodiments of the present disclosure enable the second input member to issue the vibration signal only when the first input member is in contact with the first collection unit and the first collection unit is in the working mode, so as to avoid such a case that the operating apparatus still issues the vibration signal even if the electronic device is powered down or in a sleep mode, thereby resulting in a waste of power resource. Thus, the technical solutions of the embodiments of the present disclosure can also achieve a technical effect of reducing misoperations and saving the power resource.

Further, by means of continuing to issue the vibration signal when the first input member is in contact with the first collection unit and stopping issuing the vibration signal when the first input member leaves the first collection unit, the technical solutions of the embodiments of the present disclosure enable the electronic device to timely adjust its operation mode according to variation of the continuous signal, and thus can also achieve a technical effect of improving control sensitivity of the electronic device.

Further, by means of detecting, by using the pressure sensor, the pressure value when the first input member is in contact with the first collection unit, and issuing the first signal when the pressure value is no less than the predetermined threshold, the technical solutions of the embodiments of the present disclosure can avoid such a case that the second input member is triggered to issue the vibration signal even if the operating apparatus contacts with the first collection unit by accident. It can be seen that the technical solutions of the embodiments of the present disclosure can also achieve a technical effect of further reducing the misoperations.

Further, by means of arranging striking components of various materials and flexibly switching, by the switching mechanism, one of them out of the cavity of the operating apparatus to knock at the struck member so as to issue different vibration signals, the electronic device may be controlled to be switched to different operation modes. Thus, the technical solutions of the embodiments of the present disclosure can also achieve a further technical effect of improving user experience and having wide applicability.

Further, the technical solutions of embodiments of the present disclosure may locate the touch control position by using different control components to contact with the first collection unit, and control the operation mode of the electronic device by acquiring the corresponding vibration signal issued by the control component itself during the contact. Thus, the technical solutions of the embodiments of the present disclosure can also achieve a technical effect of having a simple structure and a simple production process.

DETAILED DESCRIPTION

The present disclosure provides a control method and an electronic device, in order to solve the technical problem of the conventional operating apparatus for performing touch control operations on the electronic device, i.e., the conventional operating apparatus implements less functions with a higher cost, and thus has a lower performance price ratio.

In order to solve the technical problem mentioned above, a general idea of the technical solutions of the embodiments of the present disclosure is as follows.

By means of arranging, in the operating apparatus, the first input member for locating the touch control position via the touch control operation and the second input member for issuing vibration signal to be collected by an electronic device during the touch control operation, the technical solutions of the embodiments of the present disclosure may determine the operation mode of the electronic device based on the vibration signal, and operate the electronic device in this operation mode, thereby enabling to control the operation mode of the electronic device via the vibration signal issued when the operating apparatus is in contact with the electronic device. It can be seen that, the technical solutions of the embodiments of the present disclosure can achieve more application functions by using the apparatus for performing touch control operations on the electronic device, and thus can achieve a technical effect of extending the applicable range of the operating apparatus.

Hereafter, the solutions of the present disclosure will be illustrated in detail with reference to the drawings and specific embodiments. It should be understood that the embodiments of the present disclosure and specific feature in the embodiments are explained for purpose of detailed illustration rather than limitation. The embodiments of the present disclosure and the technical features of the embodiments can be combined with each other without conflict.

First Embodiment

Figure 1:
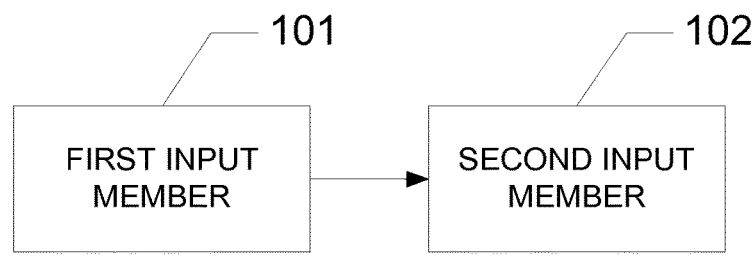
FIG. 1 shows a block diagram of an operating apparatus according to an embodiment of the present disclosure.

The first embodiment of the present disclosure provides an operating apparatus. As shown in FIG. 1, the operating apparatus comprises:

a first input member 101, arranged on a main body of the operating apparatus, configured for enabling an electronic device to locate a touch control position of the operating apparatus when the first input member is in contact with a first collection unit of the electronic device; and a second input member 102, arranged on the main body, configured for issuing vibration signal to be collected by a second collection unit of the electronic device, when the first input member is in contact with the first collection unit.

In actual operations, the operating apparatus may be a stylus, a touch bar, or any article that is capable of generating an instruction to control the electronic device when it is in contact with the touch-sensitive apparatus of the electronic device.

The first input member may be a tip of the stylus, a head of the touch bar, or a component of any article capable of operating the electronic device via the touch control operations which is in contact with the touch-sensitive apparatus of the electronic device.

The first collection unit may be a touch-sensitive apparatus, such as a touch-sensitive screen, a touch-sensitive locator, or any other touch-sensitive devices.

The second input member may be an element arranged on the operating apparatus, such as the stylus, which is capable of issuing the vibration signal, i.e. an acoustical signal. For example, the second input member may be a bell controlled by an electronic signal, wherein the electronic signal may be generated for controlling the bell to ring when the first input member is in contact with the first collection unit.

The second collection unit may be an electronic element for obtaining the acoustical signal, such as a voice recorder, a microphone or any other electronic elements for obtaining the acoustical signal, in an electronic device.

In the embodiments of the present disclosure, when the operating apparatus is operating on the electronic device via the touch control operation, the second input member may be controlled to issue the vibration signal, i.e. sound, by a control signal generated when the first input member is in contact with the first collection unit. At this time, the second collection unit of the electronic device may collect the vibration signal, and may determine the operation mode of the electronic device based on the vibration signal. For example, when the second collection unit of the electronic device collects bell rings issued by the operating apparatus, the electronic device may be controlled to operate in a power saving mode.

Of course, in actual operations, other conditions for triggering the second input member to issue the vibration signal can be established. For example, only when the first input member is in contact with the first collection unit and the display screen of the electronic device has been in a lighting state for a time period longer than a predetermined time, the control signal can be generated to control the second input member to issue the vibration signal. That is, in actual operations, the operating apparatus may issue the vibration signal according to different preset conditions.

Further, the second input member is configured for knocking at a first component or the first collection unit to issue the vibration signal when the first input member is in contact with the first collection unit, wherein the first component is the main body or is a component arranged on the main body.

That is, the second input member of the operating apparatus may issue the vibration signal by knocking at the operating apparatus or the first collection unit.

For example, if the operating apparatus is a stylus provided with a small leather hammer, when the tip of the stylus (i.e., the first input member) is in contact with the touch-sensitive screen (i.e. the first collection unit) of a mobile phone, the vibration signal may be issued by controlling the small leather hammer to knock at the body of the stylus, or by controlling the small leather hammer to knock at the touch-sensitive screen.

It can be seen that, by means of controlling the second input member to knock at the operating apparatus or the first collection unit to issue the vibration signal, the technical solution according to the embodiment of the present disclosure can expand the selectable range of means for issuing the vibration signal, and thus can achieve a technical effect of further extending the applicable range.

Further, the first input member further comprises:

an electrical response component configured for generating an electrical response and generating a response signal, when the first input member is in contact with the first collection unit and the first collection unit is in a working mode;

the second input member configured for issuing the vibration signal upon receiving the response signal.

That is, the second input member issues the vibration signal only when the first input member is in contact with the first collection unit and the first collection unit is in a working mode.

For example, in a case that the mobile phone with a touch-sensitive screen is operated by using a stylus, the small leather hammer of the stylus knocks at the body of the stylus to issue the vibration signal only when the tip of the stylus is in contact with the touch-sensitive screen, the touch-sensitive screen is in the lighting state, and the electrical response is generated between the touch-sensitive screen and the tip of the stylus. Thus, it may avoid such a case that the contact between the tip of the stylus and the touch-sensitive screen triggers the small leather hammer to issue the vibration signal even if the electronic device is powered down or in a sleep mode.

It can be seen that by means of arranging the electrical response component, the technical solution according to the embodiment of the present disclosure may enable the second input member to issue the vibration signal only when the first input member is in contact with the first collection unit and the first collection unit is in the working mode, so as to avoid such a case that the operating apparatus still issues the vibration signal even if the electronic device is powered down or in the sleep mode, resulting in a waste of power resource. Thus, the technical solutions of the embodiments of the present disclosure can also achieve a technical effect of reducing misoperations and saving the power resource.

Further, the second input member is particularly configured for continuing to issue the vibration signal when the first input member is in contact with the first collection unit, and stopping issuing the vibration signal when the first input member leaves the first collection unit.

Therefore, on one hand, it can continue to alert the user of the current operation mode of the electronic device which is being adjusted according to the vibration signal; and on the other hand, it can timely adjust the operation mode of the electronic device if the vibration signal changes, e.g. the vibration signal disappears, or the vibration signal changes to a different kind of vibration signal.

It can be seen that, by means of continuing to issue the vibration signal when the first input member is in contact with the first collection unit and stopping issuing the vibration signal when the first input member leaves the first collection unit, the technical solutions of the embodiments of the present disclosure enable the electronic device to timely adjust its operation mode according to variation of the continuous signal, and thus can also achieve a technical effect of improving control sensitivity of the electronic device.

Further, the operating apparatus further comprises:

a pressure sensor, arranged on the main body, configured for detecting a pressure value when the first input member is in contact with the first collection unit, and issuing a first signal when the pressure value is no less than a predetermined threshold, in order to inform the operating apparatus of controlling the second input member to issue the vibration signal.

That is, by means of detecting, by using the pressure sensor, the pressure value when the first input member is in contact with the first collection unit, and issuing the first signal when the pressure value is no less than the predetermined threshold, the technical solutions of the embodiments of the present disclosure can avoid such a case that the second input member is triggered to issue vibration signal even if the operating apparatus contacts with the first collection unit by accident. It can be seen that the technical solutions of the embodiments of the present disclosure can also achieve a technical effect of further reducing misoperations.

Further, the main body is of a cavity structure;

the second input member comprises:

at least one striking component, movably arranged in a cavity of the main body, configured for knocking at a struck main component on the operating apparatus to vibrate, wherein if there are at least two striking components, the at least two striking components are respectively made of different materials for generating different vibration signals;

the operating apparatus further comprises:

the struck member; arranged on a surface of the main body, configured for issuing the vibration signal when being struck by the second input member; a switching mechanism; arranged in the cavity, configured for, controlling one of the at least one striking component to extend out of the cavity through a hole, while controlling the remaining of the at least one striking component to be located within the cavity.

For example, if the operating apparatus is a stylus having a body of a cavity structure, a hole and a metal foil (i.e., the struck member) are arranged on the body of the stylus, and striking components made of three kinds of materials, including a plastic striking component, a metal striking component and a rubber striking component, are arranged in the cavity of the stylus. In addition, each of the striking components made of the three kinds of materials is movably arranged in the cavity of the stylus. The user can switch the one striking component extending from the hole on the body of the stylus via the switching mechanism, such as a retractable gear mechanism. If the plastic striking component extends from the hole via the switching mechanism and may knock at the metal foil on the body of the stylus, the metal striking component and the rubber striking component are both located within the cavity of the stylus. Accordingly, if the metal striking component extends from the hole via the switching mechanism and may knock at the metal foil on the body of the stylus, the plastic striking component and the rubber striking component are both located within the cavity of the stylus. If the rubber striking component extends from the hole via the switching mechanism and may knock at the metal foil on the body of the stylus, the plastic striking component and the metal striking component are both located within the cavity of the stylus.

It can be seen that, by means of arranging the striking components made of various materials, flexibly switching one of them out of the cavity of the operating apparatus by using a switching mechanism to knock at the struck member, so as to issue different vibration signal, the electronic device may be controlled to be switched to different operation modes. Thus, the technical solutions of the embodiments of the present disclosure can achieve a further technical effect of improved user experience and having wide applicability.

Further, the main body is of a cavity structure;

the first input member comprises:

at least one control component, movably arranged in the cavity of the main body, configured for issuing vibration signal when contacting with the first collection unit, and locating the touch control position needed to be collected by the first collection unit, wherein if there are at least two different control components, the at least two different control components generate at least two different vibration signal respectively;

the operating apparatus further comprises:

a substitution mechanism, arranged in the cavity, configured for, controlling one of the at least one control component to extend out of the cavity through an exit hole, while controlling the remaining of the at least one control component to be located within the cavity.

That is, the first input member may comprise two different components. Different vibration signals can be generated when the two different components contact with the first collection unit.

For example, there are a stylus tip made of rubber material and a stylus tip made of metal material. The sound generated when the stylus tip made of rubber material contacts with the touch-sensitive screen is significantly different from the one generated when the stylus tip made of metal material contacts with the touch-sensitive screen, though the sound is small. Thus, the operation mode of the electronic device can be adjusted according to different sounds generated when different stylus tips contact with the touch-sensitive screen.

In particular, it should be noted that, in actual operations, the function mentioned above can be improved by playing respective sounds (i.e. vibration signals) when different control components are used. For example, birdsong sound may be played when the stylus tip made of rubber material is used to contact with the touch-sensitive screen, while whistle sound may be played when the stylus tip made of rubber material is used to contact with the touch-sensitive screen.

It can be seen that the technical solutions of embodiments of the present disclosure may locate the touch control position by using different control components to contact with the first collection unit, and control the operation mode of the electronic device by acquiring the corresponding vibration signal issued by the control component itself during the contact. Thus, the technical solutions of the embodiments of the present disclosure can also achieve a technical effect of having a simple structure and a simple production process.

Second Embodiment

Figure 2:
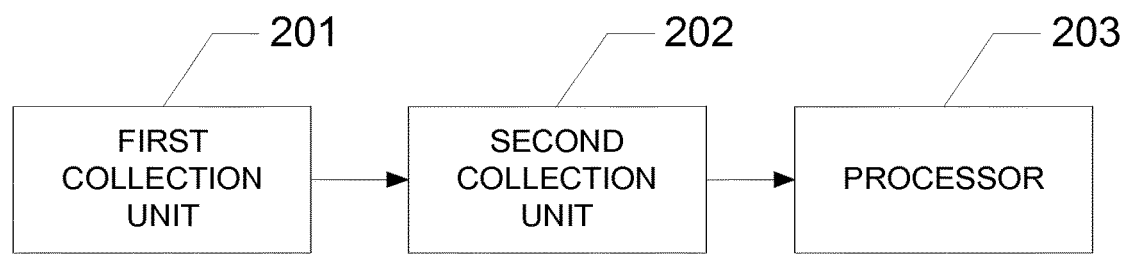
FIG. 2 shows a block diagram of an electronic device according to an embodiment of the present disclosure.

The second embodiment of the present disclosure provides an electronic device. As shown in FIG. 2, the electronic device comprises:

a first collection unit 201, configuring for locating a touch control position of an operating apparatus when the first collection unit is in contact with the operating apparatus;

a second collection unit 202, configuring for receiving a vibration signal issued by the operating apparatus;

a processor 203, configured for determining a first operation mode of the electronic device based on the vibration signal, and for controlling the electronic device to operate in the first operation mode.

Third Embodiment

Figure 3:
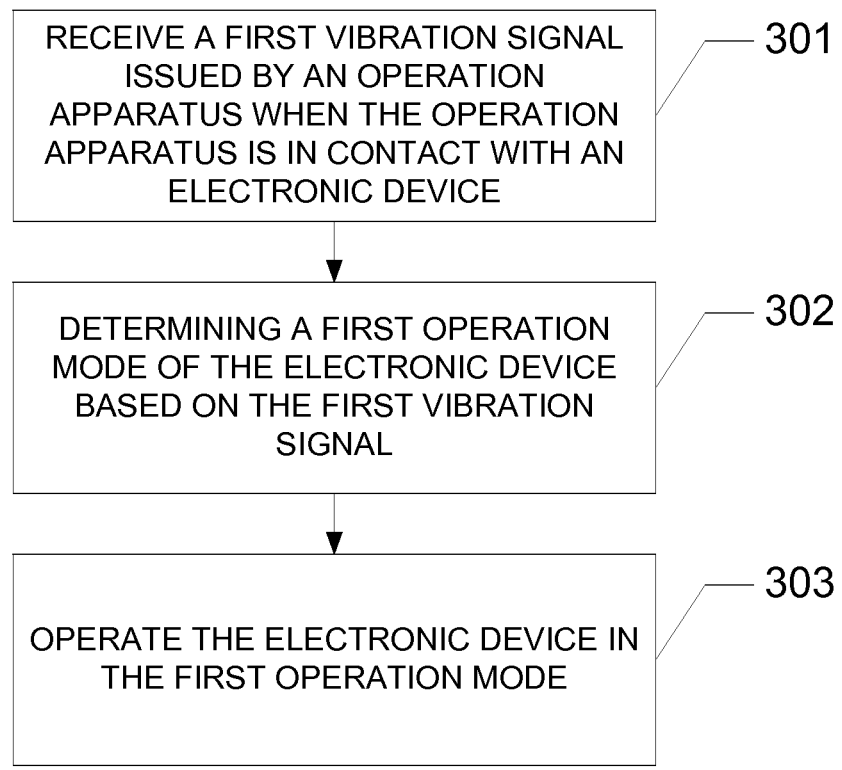
FIG. 3 shows a flowchart of a control method according to an embodiment of the present disclosure.

The third embodiment of the present disclosure provides an control method. As shown in FIG. 3, the control method comprises:

step 301 of receiving a first vibration signal issued by an operation apparatus when the operation apparatus is in contact with an electronic device;

step 302 of determining a first operation mode of the electronic device based on the first vibration signal;

step 303 of operating the electronic device in the first operation mode.

Further, the first operation mode is a mode of displaying a first track with a first color and/or a first line type, wherein the first track is a corresponding track displayed by the electronic device when the electronic device is operated by a touch control operation of the operation apparatus.

Further, the first operation mode specifically comprises: a mode of displaying a first background; and/or a mode of playing first music.

Further, after step 301, the method further comprises:

receiving a second vibration signal issued by the operation apparatus;

determining a second operation mode; different from the first operation mode, based on the second vibration signal received by the electronic device, wherein the second vibration signal is different from the first vibration signal;

switching the electronic device to operate in the second operation mode from operating in the first operation mode.

By means of arranging, in the operating apparatus, the first input member for locating the touch control position via the touch control operation and the second input member for issuing vibration signal to be collected by an electronic device during the touch control operation, the technical solutions of the embodiments of the present disclosure may determine the operation mode of the electronic device based on the vibration signal, and operate the electronic device in this operation mode, thereby enabling to control the operation mode of the electronic device via the vibration signal issued when the operating apparatus is in contact with the electronic device. It can be seen that, the technical solutions of the embodiments of the present disclosure can achieve more application functions by using the apparatus for performing touch control operations on the electronic device, and thus can achieve a technical effect of extending the applicable range of the operating apparatus.

The embodiments of the present disclosure also have at least following technical effects or advantages:

Further, by means of controlling the second input member to knock at the operating apparatus or the first collection unit to issue the vibration signal, the technical solutions of the embodiments of the present disclosure can expand a selectable range of means for issuing the vibration signal, and thus can also achieve a technical effect of further extending the applicable range.

Further, by means of arranging the electrical response component, the technical solutions of the embodiments of the present disclosure enable the second input member to issue the vibration signal only when the first input member is in contact with the first collection unit and the first collection unit is in the working mode, so as to avoid such a case that the operating apparatus still issues the vibration signal even if the electronic device is powered down or in a sleep mode, thereby resulting in a waste of power resource. Thus, the technical solutions of the embodiments of the present disclosure can also achieve a technical effect of reducing misoperations and saving the power resource.

Further, by means of continuing to issue the vibration signal when the first input member is in contact with the first collection unit and stopping issuing the vibration signal when the first input member leaves the first collection unit, the technical solutions of the embodiments of the present disclosure enable the electronic device to timely adjust its operation mode according to variation of the continuous signal, and thus can also achieve a technical effect of improving control sensitivity of the electronic device.

Further, by means of detecting, by using the pressure sensor, the pressure value when the first input member is in contact with the first collection unit, and issuing the first signal when the pressure value is no less than the predetermined threshold, the technical solutions of the embodiments of the present disclosure can avoid such a case that the second input member is triggered to issue the vibration signal even if the operating apparatus contacts with the first collection unit by accident. It can be seen that the technical solutions of the embodiments of the present disclosure can also achieve a technical effect of further reducing the misoperations.

Further, by means of arranging striking components of various materials and flexibly switching, by the switching mechanism, one of them out of the cavity of the operating apparatus to knock at the struck member so as to issue different vibration signals, the electronic device may be controlled to be switched to different operation modes. Thus, the technical solutions of the embodiments of the present disclosure can also achieve a further technical effect of improving user experience and having wide applicability.

Further, the technical solutions of embodiments of the present disclosure may locate the touch control position by using different control components to contact with the first collection unit, and control the operation mode of the electronic device by acquiring the corresponding vibration signal issued by the control component itself during the contact. Thus, the technical solutions of the embodiments of the present disclosure can also achieve a technical effect of having a simple structure and a simple production process.

Those skilled in the art should understand that the embodiments of the present disclosure may be provided as a method, system, or computer program product. Accordingly, the present application may be implemented in an entirely hardware embodiment, an entirely software embodiment, or in a form of an embodiment combined both software and hardware aspects. Further, the present application may be implemented in a computer program product embodied on one or more computer usable storage media (including, but not limited to, disk storages, CD-ROM, optical storages, and etc.) containing computer usable program codes.

This application has been illustrated with reference to the flowcharts and/or block diagrams of the method, device (system), and computer program product according to embodiments of the present application. It should be understood that, each of the processes and/or blocks in the flowcharts and/or the block diagrams, or the combination of the processes and/or blocks in the flowcharts and/or the block diagrams, can be implemented by the computer program instructions. These computer program instructions can be provided to a general purpose computer, a special purpose computer, an embedded processor or other programmable data processing apparatus, to produce a machine, such that the instructions executed by a computer or other programmable data processing apparatus generate an apparatus for implementing functions specified by one or more processes of a flowchart and/or one or more blocks of the block diagram.

These computer program instructions may also be stored in a computer readable memory, which can direct a computer or other programmable data processing apparatus to function in a particular manner, such that the instructions stored in the computer readable memory produce a manufactured article comprising instruction means for implementing functions specified by one or more processes of a flowchart and/or one or more blocks of the block diagram.

These computer program instructions may also be loaded onto a computer or other programmable data processing apparatus, such that a series of steps are implemented on the computer or other programmable apparatus to produce a computer implemented process, and thus the instructions executed on a computer or other programmable apparatus provide steps of functions specified by one or more processes of a flowchart and/or one or more blocks of the block diagram.

Specifically, the computer program instructions corresponding to a control method according to an embodiment of the present disclosure may be stored on storage media such as a CD-ROM, hard disk, U disk and the like, when the computer program instructions corresponding to the control method stored on the storage medium is read or executed by an electronic device, it comprises steps:

determining a first operation mode of the electronic device based on the first vibration signal;

operating the electronic device in the first operation mode.

Alternatively, after the computer program instructions corresponding to the step of operating the electronic device under the first operation mode is executed, it further comprise steps of:

determining a second operation mode, different from the first operation mode, based on a second vibration signal, after the second vibration signal is received, wherein the second vibration signal is issued by the operation apparatus and is different from the first vibration signal;

switching the electronic device to operate in the second operation mode from operating in the first operation mode.

Though the preferred embodiments of the present disclosure has been described, but those skilled in the art can made additional changes and modifications to these embodiments once they know the basic concept of the present disclosure. Therefore, the appended claims are intended to encompass the preferred embodiments as well as all changes and modifications falling within the scope of this application.

Obviously, those skilled in the art may make various modifications and variations to the present application without departing from the spirit and scope of the present application. Thus, if such modifications and variations belong to the scope of the claims and their equivalents, the present application is also intended to include these changes and modifications.

I claim:

1. An operating apparatus, comprising:
a first input member, arranged on a main body of the operating apparatus, configured for enabling an electronic device to locate a touch control position of the operating apparatus when the first input member is in contact with a first collection unit of the electronic device; and
a second input member, arranged on the main body, configured for issuing vibration signal to be collected by a second collection unit of the electronic device, when the first input member is in contact with the first collection unit,
wherein the main body is of a cavity structure;
the second input member comprises: at least one striking component, movably arranged in a cavity of the main body, configured for knocking at a struck member on the operating apparatus to generate vibration, wherein if there are at least two striking components, the at least two striking components are respectively made of different materials for generating different vibration signals respectively; and
the operating apparatus further comprises:
the struck member, arranged on a surface of the main body, configured for issuing the vibration signal when being struck by the second input member; and
a switching mechanism, arranged in the cavity, configured for, controlling one of the at least one striking component to extend out of the cavity through a hole, while controlling the remaining of the at least one striking component to be located within the cavity.

2. The operating apparatus according to claim 1, wherein the first input member further comprises:
an electrical response component, configured for generating an electrical response and generating a response signal, when the first input member is in contact with the first collection unit and the first collection unit is in a working mode;
the second input member, configured for issuing the vibration signal upon receiving the response signal.

3. The operating apparatus according to claim 2, wherein, the main body is of a cavity structure; and
the first input member comprises:
at least one control component, movably arranged in the cavity of the main body, configured for issuing vibration signal when contacting with the first collection unit, and locating the touch control position needed to be collected by the first collection unit, wherein if there are at least two different control components, the at least two different control components generate at least two different vibration signals respectively;

the operating apparatus further comprises:
a substitution mechanism, arranged in the cavity, configured for, controlling one of the at least one control component to extend out of the cavity through an exit hole, while controlling the remaining of the at least one control component to be located within the cavity.

4. The operating apparatus according to claim 1, wherein the second input member is further configured for continuing to issue the vibration signal when the first input member is in contact with the first collection unit, and stopping issuing the vibration signal when the first input member leaves the first collection unit.

5. The operating apparatus according to any one of claims 1 and 2, wherein the operating apparatus further comprises:
a pressure sensor, arranged in the main body, configured for detecting a pressure value when the first input member is in contact with the first collection unit, and issuing a first signal for controlling the second input member to issue the vibration signal when the pressure value is no less than a predetermined threshold.

* * * * *